United States Patent
Bagnall

(10) Patent No.: US 7,699,277 B2
(45) Date of Patent: Apr. 20, 2010

(54) MAGNETIC ATTACHMENT APPARATUS

(76) Inventor: Gary Wayne Bagnall, 3650 Sacramento Dr., San Luis Obisbo, CA (US) 93401

( * ) Notice: Subject to any disclaimer, the term of this patent is extended or adjusted under 35 U.S.C. 154(b) by 509 days.

(21) Appl. No.: 11/681,314

(22) Filed: Mar. 2, 2007

(65) Prior Publication Data
US 2008/0210835 A1  Sep. 4, 2008

(51) Int. Cl.
*A47G 1/17* (2006.01)
(52) U.S. Cl. .............. 248/206.5; 248/683; 248/309.4; 248/229.16; 119/230; 119/245
(58) Field of Classification Search ........... 248/206.5, 248/683, 309.4, 226.11, 226.12, 228.6, 228.7, 248/230.6, 230.7, 74.1, 74.2, 229.15, 229.16, 248/229.25, 231.7, 231.81, 316.7, 229.26; 119/200, 230, 233, 245
See application file for complete search history.

(56) References Cited

U.S. PATENT DOCUMENTS

| | | | |
|---|---|---|---|
| 3,521,332 A * | 7/1970 | Kramer ........................ 403/188 |
| 4,708,089 A | 11/1987 | Goldman et al. |
| 5,028,223 A | 7/1991 | Ameter |
| 5,067,059 A | 11/1991 | Hwang |
| 5,269,338 A * | 12/1993 | Figas ......................... 137/140 |
| 5,778,824 A * | 7/1998 | Musgrave et al. ........... 119/230 |
| 5,857,430 A | 1/1999 | Griffiths |
| 5,988,109 A | 11/1999 | Rofen |
| 6,102,768 A * | 8/2000 | Cho ........................... 446/177 |
| 6,206,978 B1 | 3/2001 | Tsui |
| 6,216,987 B1 * | 4/2001 | Fukuo ....................... 248/74.2 |
| 6,561,206 B1 * | 5/2003 | Wilkinson .................... 135/65 |
| 6,634,052 B2 | 10/2003 | Hanson |
| 6,701,870 B1 | 3/2004 | Van Heygen |
| 6,865,771 B2 | 3/2005 | Hanson |
| 6,988,290 B2 | 1/2006 | Enoch, III et al. |
| 7,024,792 B2 * | 4/2006 | Graham ....................... 33/770 |
| 7,232,519 B2 | 6/2007 | Bluteau |
| 2004/0031118 A1 | 2/2004 | Hanson |
| 2004/0112300 A1 | 6/2004 | Heygen |
| 2004/0216253 A1 | 11/2004 | Enoch, III et al. |
| 2005/0076851 A1 | 4/2005 | Allis |
| 2006/0048326 A1 | 3/2006 | Huang |
| 2006/0086650 A1 | 4/2006 | Bluteau |
| 2006/0090278 A1 | 5/2006 | Hang |
| 2006/0174840 A1 | 8/2006 | Rafailovich |
| 2006/0192062 A1 | 8/2006 | Tunze |
| 2006/0262830 A1 | 11/2006 | Yim |

FOREIGN PATENT DOCUMENTS

EP  1053676 A1  11/2000

(Continued)

*Primary Examiner*—J. Allen Shriver
*Assistant Examiner*—Todd M. Epps
(74) *Attorney, Agent, or Firm*—Evan M. Kent; Stewart L. Gitler

(57) ABSTRACT

Provided is, among other things, an attachment apparatus that includes an attachment base, a magnet attached to a first side of the attachment base and a clip structure extending from a second side of the attachment base, the second side being opposite the first side. The clip structure, in turn, includes first and second arms which can be resiliently spread apart in order to receive an item and then released in order to close around the item.

6 Claims, 2 Drawing Sheets

FOREIGN PATENT DOCUMENTS

| | | |
|---|---|---|
| EP | 1552765 A1 | 4/2004 |
| GB | 1254402 | 11/1971 |
| JP | 10127530 | 5/1998 |
| WO | WO9615697 | 5/1996 |
| WO | WO2004107855 | 12/2004 |

* cited by examiner

MAGNETIC ATTACHMENT APPARATUS

FIELD OF THE INVENTION

The present invention pertains to magnetic attachment apparatuses and is particularly applicable to apparatuses for securing hoses, tubes and other components to the inner wall of an aquarium.

BACKGROUND

Aquariums and terrariums often attempt to closely replicate the natural environment for various fish, reptiles and/or other types of animals. In many cases, for example, several different devices are employed to maintain the proper environment within an aquarium. Such devices can include heaters, air pumps and filters, which typically require the use of hoses, tubes and/or electrical wires. For both aesthetic and practical reasons, it often is desirable to secure such components to the side walls of the aquarium. Conventionally, this has been accomplished by using suction cups.

However, the present inventor has discovered that suction cups often fail after a relatively short period of time and have a number of other shortcomings.

SUMMARY OF THE INVENTION

The present invention addresses these shortcomings by, inter alia, providing improved attachment apparatuses that use magnets rather than suction cups.

Thus, in one aspect the invention is directed to an attachment apparatus that includes an attachment base, a magnet attached to a first side of the attachment base and a clip structure extending from a second side of the attachment base, the second side being opposite the first side. The clip structure, in turn, includes first and second arms which can be resiliently spread apart in order to receive an item and then released in order to close around the item.

By virtue of the foregoing arrangement, it often is possible to secure a wide variety of different items and to do so in a manner that is more secure than conventional suction cups.

In another aspect, the invention is directed to an attachment apparatus having an attachment structure and a backing structure. The attachment structure includes (i) an attachment means for releasably attaching to, and thereby restraining movement of, a matching component and (i) a first magnet having an outer surface. The backing structure includes (i) gripping means on a first side of the backing structure for allowing a user to grasp and manipulate the backing structure and (i) a second magnet having an outer surface. The outer surface of the first magnet has an opposite magnetic pole than the outer surface of the second magnet.

The foregoing arrangement often can provide an attachment apparatus that can be used on a wide variety of walls and other surfaces. Moreover, because the backing structure includes a gripping means, it often will be easy to manipulate the backing structure, thereby also moving the attachment structure. In one example, the backing structure is on the outside of an aquarium tank and the attachment structure is inside the aquarium and beneath the water's surface, and the attachment structure is moved without the necessity of inserting one's hand into the water.

The foregoing summary is intended merely to provide a brief description of certain aspects of the invention. A more complete understanding of the invention can be obtained by referring to the claims and the following detailed description of the preferred embodiments in connection with the accompanying figures.

DESCRIPTION OF THE PREFERRED EMBODIMENT(S)

Figure 1:
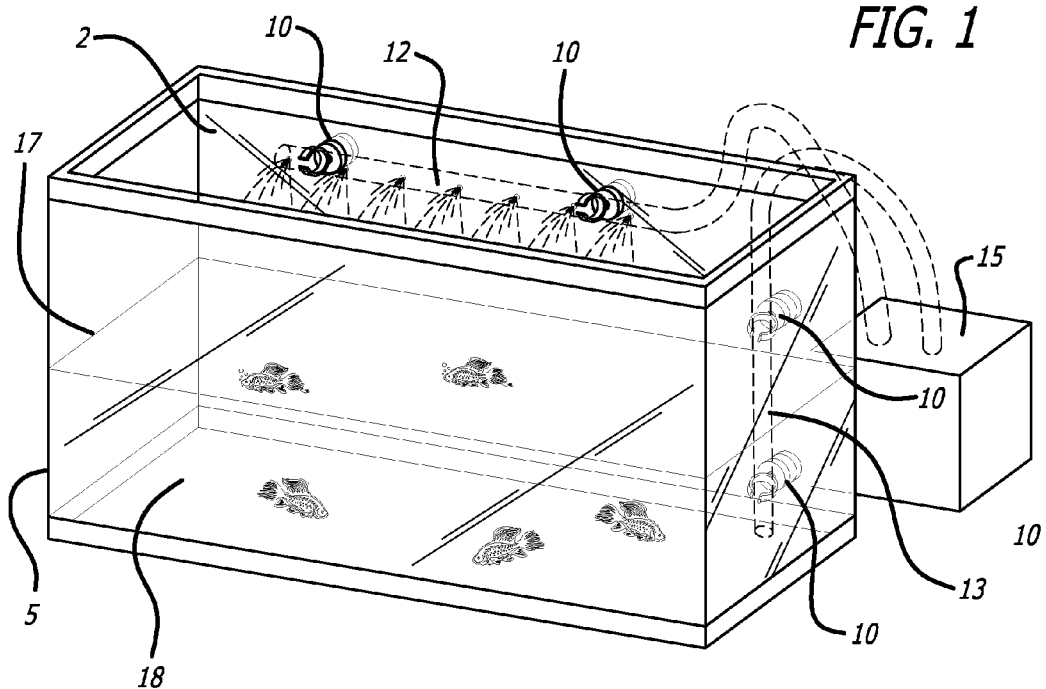
FIG. 1 is a perspective view showing several magnetic attachment apparatuses in use according to a representative embodiment of the present invention.

FIG. 1 is a perspective view showing an aquarium 5 in which magnetic attachment apparatuses 10 are in use, supporting a filter spray bar 12 and a filter inlet hose 13, both of which being attached to an external filter 15, according to a representative embodiment of the present invention. As shown, both of the attachment apparatuses 10 supporting the filter spray bar 12 are above the surface 17 of the water 18 in aquarium 5. In contrast, one of the attachment apparatuses 10 supporting the filter inlet hose 13 is above the surface 17 of the water 18, while the other is submerged.

Figure 2:
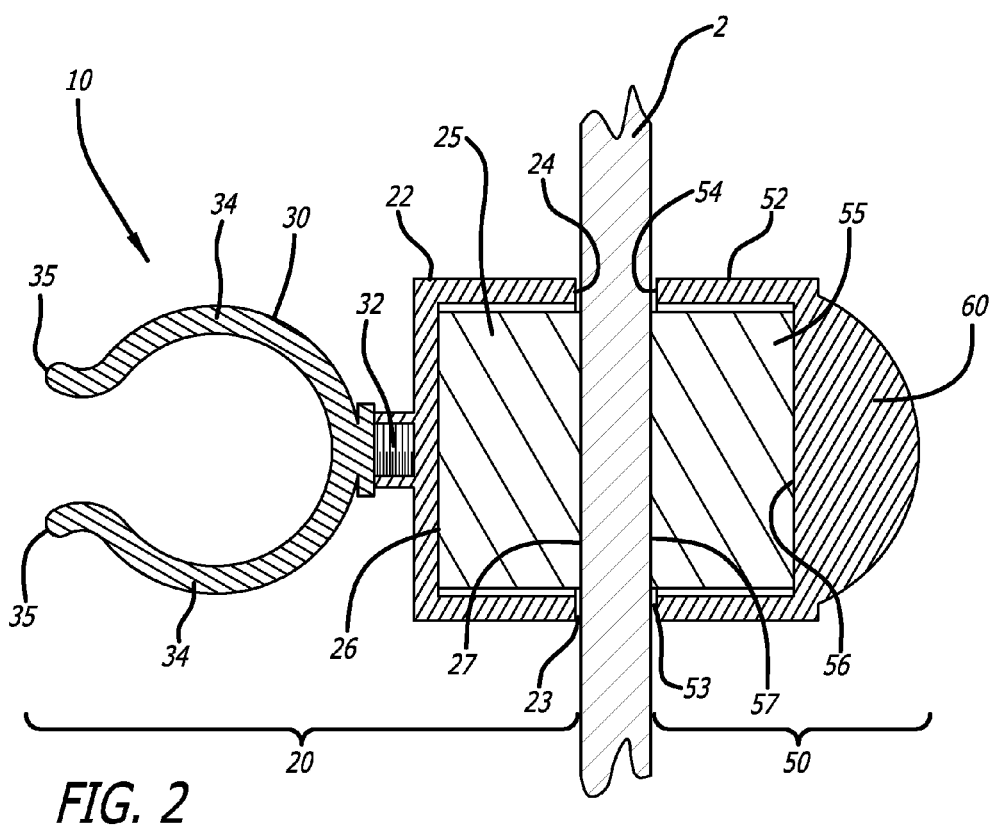
FIG. 2 illustrates a cross-sectional view of a magnetic attachment apparatus, according to a representative embodiment of the present invention.
Figure 3:
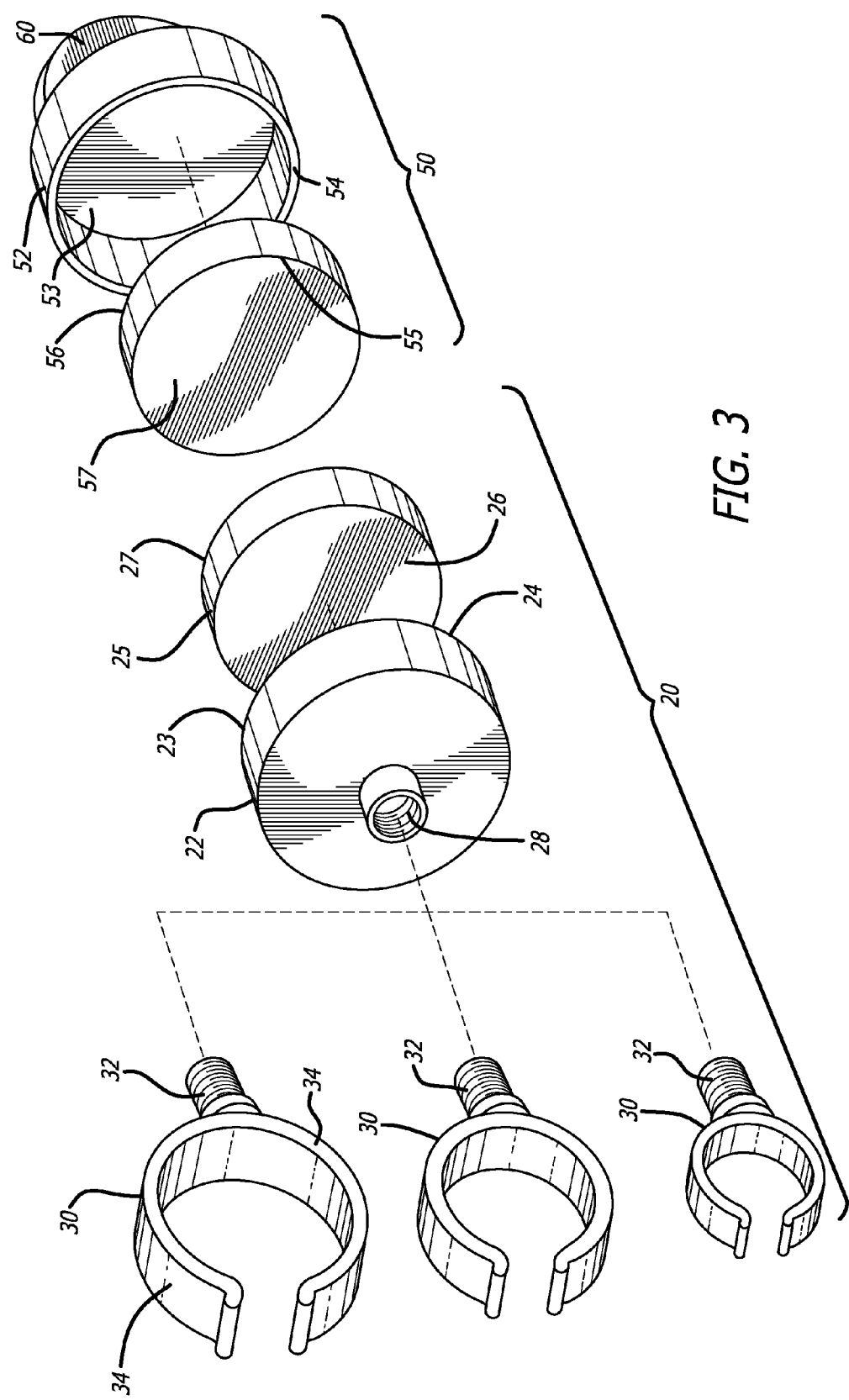
FIG. 3 provides an exploded view of a magnetic attachment apparatus according to a representative embodiment of the present invention.

FIGS. 2 and 3 illustrate cross-sectional and exploded views, respectively, of an individual attachment apparatus 10 according to a representative embodiment of the present invention. As shown, particularly in FIG. 2, attachment apparatus 10 generally includes two separate structures, an attachment structure 20 and a backing structure 50. In use, structures 20 and 50 attract toward each other magnetically on different sides of a wall 2 which, for example, could be one of the side walls of aquarium 5.

As shown in the drawings, attachment structure 20 includes an attachment base 22, a magnet 25 and an attachment mechanism 30. The attachment base 22 essentially provides a structure or other means for joining the magnet 25 to the attachment mechanism 30. In the present embodiment, attachment base 22 is made of plastic. However, in alternate embodiments of the invention other types of materials instead may be used. In still further embodiments, attachment base 22 could simply consist of a layer of adhesive material for attaching magnet 25 to attachment mechanism 30.

In the present embodiment, magnet 25 is disc-shaped, having a flat inner surface 26 and a flat outer surface 27, which define its opposite poles. However, other shapes instead may be used. In this regard, the present embodiment contemplates attachment to a wall or other flat surface, so at least the outer surface 27 of magnet 25 preferably is flat. However, in alternate embodiments the attachment mechanism is optimized for attachment to a curved or other non-flat surface. In such embodiments, the outer surface 27 of the magnet 25 may be shaped so as to conform to the intended non-flat surface. Alternatively, or in addition, the outer surface 27 of magnet 25 may be coated with another material that can be more easily shaped to fit the surface on which it is to be used, or maybe coated with a material that is deformable at the anticipated operating temperature (e.g., clay or a clay-like substance) that can be molded to the desired surface. Such other material can be made, e.g., from a plastic or polymer and, in certain embodiments, is included as part of attachment base 22.

In the present embodiment, attachment base 22 has an opening 23 for accepting magnet 25. Accordingly, magnet 25 can be fixed to attachment base 22 by coating the inner surface 26 of magnet 25 and/or the inner surface of opening 23 with an adhesive material and then simply inserting magnet 25 into opening 23. Preferably, upon completion of this process the outer surface 27 of magnet 25 is approximately flush with the outer edge 24 of attachment base 22.

However, in alternate embodiments of the invention edges 24 extend above the outer surface 27 of magnet 25, thereby preventing the magnet 25 from directly contacting the surface (e.g., wall 2) to which it is to be attached. Moreover, in such alternate embodiments, after magnet 25 has been inserted into opening 23 a layer of material (e.g., a plastic or polymer) may be deposited into opening 23 so as to fully enclose magnet 25, thereby further protecting it and the surface (e.g., wall 2) to which it is to be attached. Still further, the attachment base 22 and magnet 25 may be inserted into a mold for forming an outer surface having any desired shape and/or contour (e.g., for matching the shape of a surface to which it is to attach).

In the present embodiment, attachment mechanism 30 is configured as a clip structure having a threaded male section 32 for engaging with a mated threaded female section 28 in attachment base 22. More specifically, in the present embodiment the clip structure is formed by a pair of resilient arms 34 which can be spread apart in order to receive an item to be held in place (e.g., a hose, device or cable) and then subsequently released in order to close around such item. In order to facilitate this process, arms 34 have end tips 35 that flare outwardly. As a result, attachment mechanism 30 often can be simply pressed against the desired item in order to snap onto it. As shown, in the present embodiment, the arms 34 together to find a semicircular shape, which is particularly appropriate for tubes, hoses, cables and other cylindrically shaped items. If items having other shapes are contemplated, the arms 35 preferably are configured to match the shape of the item desired to be held.

In the preferred embodiments, and as shown in the example illustrated in FIG. 3, a variety of different but interchangeable attachment mechanisms 30 preferably are provided. Each such different attachment mechanism 30 preferably has a different size and/or shape for accommodating correspondingly different sizes and/or shapes of items to be retained. In this regard, it is noted that an attachment mechanism 30 may be used for tightly holding or attaching to an item, thereby largely preventing the item from moving at all, or for loosely holding or attaching to the item, thereby restricting but not completely preventing movement, e.g., by allowing the item to easily slide up and down but preventing lateral movement. The provision of different-sized attachment mechanisms 30 facilitates such selection. As noted above, providing differently shaped attachment mechanisms 30 can facilitate the securing of items having non-cylindrical shapes, e.g., items having a rectangular or triangular cross section.

In any event, several of the provided attachment mechanisms 30 preferably have identical threaded sections 32 for removably attaching to the attachment base 22, thereby facilitating interchangeability. More generally, in alternate embodiments of the invention where different means (e.g., clips, pins, set screws or snap-fit mechanisms) are used for removably attaching attachment mechanism 30 to attachment base 22, each of several provided attachment mechanisms 30 preferably is compatible with the provided attachment base 22.

For purposes of use with an aquarium or terrarium, the attachment mechanisms 30 preferably have an inner diameter (or other maximum inner dimension, if not substantially circular in shape) of ¼ inch to 1½ inches when the arms 34 are not spread apart or compressed, with typical dimensions being in the range of ½ to 1 inch. However, even smaller attachment mechanisms, e.g., having an inner diameter (or other maximum inner dimension, if not substantially circular in shape) of ⅛ inch can be used for securing lawyers or other narrow items.

Backing structure 50 preferably is similar in construction to attachment structure 20. As shown in the drawings, backing structure 50 preferably includes just two components: a backing base 52 and a second magnet 55. More preferably, magnet 55 is identical in size and shape to magnet 25, although turned in the opposite direction so that the outer surfaces 57 and 27, respectively, have opposite magnetic poles and therefore strongly attract each other.

In the present embodiment, magnet 55 is accommodated by an opening 53 in backing base 52 and, similar to magnet 25, can be held in place by using a separate adhesive material to glue the inner surface 56 of magnet 55 to the inner surface of opening 53 in backing base 52. Alternatively, if the outer edge 54 of backing base 52 extends above the outer surface 57 of magnet 55, e.g., then a thin layer of material can be deposited so as to completely enclose magnet 55, as discussed above in connection with magnet 25.

Preferably, backing base 52 is provided with a gripping portion (or simply "grip") 60 for allowing a user to easily grasp the backing base 52 with his or her fingers or hand and thereby to manipulate backing structure 50. In the present embodiment, grip 60 is configured as a flat semicircular tab. However, any other structure that facilitates grasping and manipulating instead may be used, such as a ring, a handle or a knob.

In use, an attachment structure 20 that is appropriate to the desired task (e.g., based on the size, configuration and/or shape of the attachment mechanism 30) first is selected. If the attachment mechanism 30 is readily detachable from the attachment base 20 (e.g., as described above), then the desired attachment mechanism 30 may be selected and, if not already installed on attachment base 22, secured to attachment base 22 (e.g., by removing an existing attachment mechanism 30 and replacing it with the desired attachment mechanism 30, such as by unscrewing the existing one and screwing on the new one).

The attachment structure 20 is placed on one side of a wall 2 (typically the inside surface) and the backing structure 50 is placed on the other side of the wall 2 (typically the outside surface). Usually, although not necessarily always, wall 2 will be transparent so that it will be easy to align the two structures 20 and 50 with each other. However, even if wall 2 is opaque, the strong magnetic attraction between the two structures 20 and 50 often will make it easy to match up the two structures 20 and 50.

As noted above, the attachment mechanism 30 can be simply snapped onto the corresponding item to be held. This step can be performed either before or after the aligning of the two structures 20 and 50 on opposite sides of a wall 2, as described in the preceding paragraph. In any event, once the magnetic attachment apparatus 10 is in place and being used to secure a desired item (e.g., device, hose or cable), it often will be possible to move the backing structure 50, thereby causing the attachment structure 20 also to move by virtue of its magnetic attraction to backing structure 50. As a result, for example, a magnetic attachment apparatus 10 that is being used to hold an item under the surface 17 of the water 18 can be moved, as desired, without the user having to insert his or her hand into the water 18. The provision of a grip 60 on backing structure 50 can facilitate such manipulations.

In order to minimize manufacturing costs, each attachment mechanism 30, attachment base 22 and backing base 52 preferably is produced as a unitary piece, e.g., by injection molding. As noted above, standard-sized magnets 25 and 55 may then be simply glued into the respective openings 23 and 53 to complete the construction.

Additional Considerations.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. An attachment apparatus for an aquarium, comprising:
   (a) an attachment base;
   (b) a magnet attached to a first side of the attachment base; and
   (c) a removable semi-circular resilient clip structure extending from, and attached to, a threaded female section of a second side of the attachment base, the second side being opposite the first side, wherein the resilient clip structure removably attaches to the attachment base using threaded sections attached to the clip structure, the threaded sections of the clip structure mate with the threaded female section located on the second side of the attachment base, and the clip structure includes separate and non-pivoted first and second arms which can be spread apart in order to receive an item and then released in order to close around the item, and
   (d) a magnetic backing component having a first side that includes a grip and a second side having a flat magnetic surface, the flat magnetic surface of the backing component having an opposite magnetic pole than the flat outer surface of the magnet, wherein the magnet and the magnetic backing component are magnetically coupled to each other such that (i) an assembly that includes the magnet, attachment base and clip structure is attached to an inner wall of a glass enclosure, and (ii) the magnetic backing component is attached to an outer wall of the glass enclosure.

2. The attachment apparatus according to claim 1, further comprising a second clip structure with a threaded section having at least one of a different size or a different shape than the clip structure, and wherein the second clip structure also can be removably attached to the threaded female section of the attachment base, such that said attachment apparatus has different interchangeable clip structures for different purposes.

3. The attachment apparatus according to claim 2, wherein the clip structure and the second clip structure attach to the attachment base using mated threaded surfaces.

4. The attachment apparatus according to claim 1, wherein the magnet has an inner surface attached to the attachment base and a flat outer surface.

5. The attachment apparatus according to claim 1, wherein the first and second arms of the clip structure together define a shape that is at least approximately semicircular.

6. The attachment apparatus according to claim 1, wherein the first and second arms have end tips that flare outwardly.

\* \* \* \* \*